United States Patent
Tang et al.

(10) Patent No.: US 11,595,204 B2
(45) Date of Patent: Feb. 28, 2023

(54) ADAPTIVE RE-KEYING IN A STORAGE SYSTEM

(71) Applicant: EMC IP Holding Company LLC, Hopkinton, MA (US)

(72) Inventors: Xuan Tang, Hopkinton, MA (US); Marion Meirlaen, Framingham, MA (US)

(73) Assignee: EMC IP Holding Company LLC, Hopkinton, MA (US)

(*) Notice: Subject to any disclaimer, the term of this patent is extended or adjusted under 35 U.S.C. 154(b) by 679 days.

(21) Appl. No.: 16/431,132

(22) Filed: Jun. 4, 2019

(65) Prior Publication Data
US 2020/0389305 A1 Dec. 10, 2020

(51) Int. Cl.
*H04L 9/08* (2006.01)
*G06F 11/30* (2006.01)
*G06F 3/06* (2006.01)
*G06F 11/34* (2006.01)

(52) U.S. Cl.
CPC .......... *H04L 9/0891* (2013.01); *G06F 3/0622* (2013.01); *G06F 3/0637* (2013.01); *G06F 3/0689* (2013.01); *G06F 11/3034* (2013.01); *G06F 11/3414* (2013.01)

(58) Field of Classification Search
CPC ... H04L 9/0891; G06F 3/0622; G06F 3/0637; G06F 3/0689; G06F 11/3034; G06F 11/3414; G06F 3/0623; G06F 3/0638; G06F 3/0683; G06F 11/3055; G06F 11/3409
See application file for complete search history.

(56) References Cited

U.S. PATENT DOCUMENTS

| | | | | |
|---|---|---|---|---|
| 5,146,497 A * | 9/1992 | Bright | ................... | H04L 9/0891 380/273 |
| 5,164,986 A * | 11/1992 | Bright | ...................... | H04L 9/12 380/43 |
| 5,542,066 A * | 7/1996 | Mattson | .............. | G06F 12/0804 711/E12.04 |
| 6,711,264 B1 * | 3/2004 | Matsumoto | ............... | H04L 9/14 380/283 |
| 6,721,870 B1 * | 4/2004 | Yochai | .................. | G06F 3/0689 711/204 |
| 7,983,423 B1 * | 7/2011 | Agarwal | ............... | H04L 9/0891 380/278 |

(Continued)

OTHER PUBLICATIONS

U.S. Appl. No. 16/208,790 filed in the name of Radia J. Perlman et al. dated Dec. 4, 2018 and entitled "Client-Side Encryption Supporting Deduplication Across Single or Multiple Tenants in a Storage System.".

*Primary Examiner* — Aravind K Moorthy
(74) *Attorney, Agent, or Firm* — Ryan, Mason & Lewis, LLP

(57) ABSTRACT

Techniques for adaptive re-keying of encrypted data are provided. For example, a method comprises the following steps. Utilization information associated with a storage system is obtained, wherein the storage system comprises a set of storage devices. The method dynamically selects a re-keying process from a plurality of different re-keying processes based on at least a portion of the obtained utilization information. At least a portion of the set of storage devices are re-keyed in accordance with the selected re-keying process.

20 Claims, 5 Drawing Sheets

(56) References Cited

U.S. PATENT DOCUMENTS

| | | | | |
|---|---|---|---|---|
| 8,010,810 B1* | 8/2011 | Fitzgerald | H04L 9/0822 | 380/278 |
| 8,140,851 B1* | 3/2012 | Mynam | H04L 9/3297 | 713/172 |
| 8,170,213 B1* | 5/2012 | Harwood | H04L 9/0894 | 711/100 |
| 8,380,928 B1* | 2/2013 | Chen | G06F 3/0685 | 718/104 |
| 8,515,079 B1* | 8/2013 | Asati | H04L 63/062 | 380/278 |
| 8,634,560 B1* | 1/2014 | Ng | H04L 9/12 | 380/279 |
| 8,688,878 B1* | 4/2014 | Dolan | G06F 3/0653 | 710/33 |
| 8,799,681 B1* | 8/2014 | Linnell | G06F 21/80 | 713/193 |
| 9,032,218 B2* | 5/2015 | Iswandhi | G06F 12/16 | 713/189 |
| 9,330,009 B1* | 5/2016 | Throop | G06F 12/0866 | |
| 9,389,916 B1* | 7/2016 | Miller | G06F 11/3409 | |
| 9,659,190 B1 | 5/2017 | Perlman et al. | | |
| 9,720,700 B1* | 8/2017 | Brown | G06F 13/4068 | |
| 9,779,269 B1 | 10/2017 | Perlman | | |
| 9,804,966 B1* | 10/2017 | Sadanandan | G06F 3/0611 | |
| 9,811,288 B1* | 11/2017 | Chen | G06F 3/0685 | |
| 9,830,278 B1* | 11/2017 | Harwood | H04L 63/061 | |
| 9,906,361 B1* | 2/2018 | Perlman | G06F 16/22 | |
| 10,152,339 B1* | 12/2018 | Dong | G06F 11/261 | |
| 10,256,969 B1* | 4/2019 | Salinas | H04L 63/0428 | |
| 10,284,534 B1 | 5/2019 | Perlman et al. | | |
| 10,298,551 B1 | 5/2019 | Perlman et al. | | |
| 10,609,070 B1* | 3/2020 | Farmer, III | H04L 63/126 | |
| 11,240,022 B1* | 2/2022 | Griffin | H04L 9/0891 | |
| 2003/0097531 A1* | 5/2003 | Arimilli | G06F 12/0831 | 711/146 |
| 2005/0071279 A1* | 3/2005 | Asano | G06F 21/10 | 705/57 |
| 2005/0120111 A1* | 6/2005 | Bailey | G06F 11/3409 | 709/224 |
| 2006/0136504 A1* | 6/2006 | Babutzka | G06Q 10/10 | |
| 2007/0074047 A1* | 3/2007 | Metzger | H04L 9/12 | 713/193 |
| 2008/0109811 A1* | 5/2008 | Krauthgamer | G06F 1/329 | 718/104 |
| 2008/0240428 A1* | 10/2008 | Hobbet | H04L 9/0891 | 380/45 |
| 2009/0103724 A1* | 4/2009 | Tamai | H04L 9/0891 | 380/44 |
| 2009/0196414 A1* | 8/2009 | Mittal | H04L 9/06 | 380/28 |
| 2009/0271638 A1* | 10/2009 | Kawakami | H04L 9/0891 | 713/193 |
| 2009/0323964 A1* | 12/2009 | Park | H04L 9/0891 | 380/277 |
| 2010/0091993 A1* | 4/2010 | Iwama | H04L 9/0891 | 380/273 |
| 2010/0191933 A1* | 7/2010 | Sonnekalb | G06F 12/1416 | 712/E9.007 |
| 2011/0038477 A1* | 2/2011 | Bilodi | H04L 9/0891 | 380/44 |
| 2011/0087843 A1* | 4/2011 | Zhao | G06F 12/0864 | 711/E12.001 |
| 2011/0116627 A1* | 5/2011 | Deng | H04L 9/0631 | 380/28 |
| 2011/0191595 A1* | 8/2011 | Damian | H04L 9/06 | 713/189 |
| 2011/0225017 A1* | 9/2011 | Radhakrishnan | G06Q 10/06315 | 705/7.25 |
| 2011/0231854 A1* | 9/2011 | Augenstein | G06F 9/50 | 718/103 |
| 2011/0296122 A1* | 12/2011 | Wu | G06F 12/0804 | 711/E12.001 |
| 2011/0299685 A1* | 12/2011 | Hall | H04L 9/0822 | 380/281 |
| 2011/0311049 A1* | 12/2011 | Amaudruz | H04L 9/088 | 380/278 |
| 2012/0331293 A1* | 12/2012 | Ma | H04N 21/2387 | 713/168 |
| 2013/0173930 A1* | 7/2013 | Obligacion | G06F 21/6218 | 713/193 |
| 2013/0208892 A1* | 8/2013 | Moriguchi | G06F 21/805 | 380/277 |
| 2014/0040410 A1* | 2/2014 | McDowell | G06F 3/0647 | 709/212 |
| 2014/0215126 A1* | 7/2014 | Avila | G06F 3/0688 | 711/103 |
| 2015/0033037 A1* | 1/2015 | Lidman | G06F 21/78 | 713/193 |
| 2015/0052369 A1* | 2/2015 | Koning | H04L 9/0894 | 713/193 |
| 2015/0081978 A1* | 3/2015 | Daly | G06F 12/12 | 711/133 |
| 2015/0086009 A1* | 3/2015 | Harjula | H04L 9/088 | 380/44 |
| 2015/0139422 A1* | 5/2015 | Jover | H04L 9/0819 | 380/270 |
| 2015/0249467 A1* | 9/2015 | Nakanishi | H04L 9/0894 | 714/800 |
| 2016/0085696 A1* | 3/2016 | Chiu | G06F 3/0647 | 711/164 |
| 2016/0191412 A1* | 6/2016 | Min | H04L 41/083 | 709/226 |
| 2016/0291882 A1* | 10/2016 | Wakhare | G06F 3/0613 | |
| 2017/0061566 A1* | 3/2017 | Min | H04L 49/45 | |
| 2017/0230173 A1* | 8/2017 | Choi | H04L 9/12 | |
| 2017/0257214 A1* | 9/2017 | Stufflebeam | H04L 63/20 | |
| 2017/0331802 A1* | 11/2017 | Keshava | H04L 9/0894 | |
| 2018/0150620 A1* | 5/2018 | Hensgen | H04N 21/26216 | |
| 2018/0189193 A1* | 7/2018 | Bernat | G06F 3/0656 | |
| 2018/0254901 A1* | 9/2018 | Egorov | H04L 9/0822 | |
| 2018/0278418 A1* | 9/2018 | Chang | H04L 9/0891 | |
| 2018/0287785 A1* | 10/2018 | Pfannenschmidt | H04L 9/14 | |
| 2018/0307418 A1* | 10/2018 | Brown | G06F 3/067 | |
| 2018/0359228 A1* | 12/2018 | Lerner | G06F 21/606 | |
| 2019/0087301 A1* | 3/2019 | M | H04L 12/4633 | |
| 2019/0087353 A1* | 3/2019 | Isozaki | G06F 21/575 | |
| 2019/0196731 A1* | 6/2019 | Sapuntzakis | G06F 3/062 | |
| 2019/0238331 A1* | 8/2019 | Chandra | H04L 9/0861 | |
| 2019/0340136 A1* | 11/2019 | Irwin | G06F 21/602 | |
| 2020/0012729 A1* | 1/2020 | Shaikh | G06F 3/064 | |
| 2020/0134202 A1* | 4/2020 | Sapuntzakis | G06F 21/602 | |
| 2020/0153616 A1* | 5/2020 | Savalle | H04L 63/0428 | |
| 2020/0201785 A1* | 6/2020 | Hanna | G06F 11/1048 | |
| 2020/0314174 A1* | 10/2020 | Dailianas | G06F 9/45558 | |

* cited by examiner

```
If (Spare drive is available & all drives are in healthy condition)
{
    Start rekeying through proactive sparing
}
Else if (cache utilization > x%)
{
    If (We can wait 1 day for a sparing drive to become available)
    {
        Wait for a day
    }
    Else
    {
        If (I/O workload is high)
        {
            Start Data in place rekey with low rekey speed;
        }
        Else if (I/O workload is Medium)
        {
            Start data in place rekey with Medium rekey speed;
        }
        Else
        {
            Start data in place rekey with high rekey speed;
        }
    }
}
```

ADAPTIVE RE-KEYING IN A STORAGE SYSTEM

FIELD

The field relates generally to information security, and more particularly to techniques for providing adaptive re-keying of encrypted data in an information processing system.

BACKGROUND

Conventional information processing systems are often configured to implement so-called "data at rest" encryption. Data at rest typically refers to data that is currently in an inactive state and persistently stored. In contrast, two other typical data states include "data in use" (i.e., data that is currently being manipulated by a system or application program and is therefore considered active data and non-persistently stored) and "data in transit" (i.e., data that is currently being transferred from one storage location to another).

There has been wide adoption of data at rest encryption solutions in the past several years, driven by increasing demand for better data security. A controller-based drive encryption solution uses an encryption engine on the drive controller to encrypt data written to the storage drives with a unique cryptographic key for each drive. As a best practice of encryption, and as a common regulatory compliance requirement, encryption keys are periodically changed. The process of changing a cryptographic key is referred to as "re-keying."

Re-keying the data encryption key protects against possible exposure of the initial or current encryption key. However, depending on the amount of data to encrypt, re-keying encrypted data volumes/drives can take a long time and require a significant amount of system computation resources. Existing approaches use a static re-key policy preconfigured in the storage system. The preconfigured policy typically sets the fixed dates or time intervals for the re-key events.

SUMMARY

Illustrative embodiments of the invention provide techniques for adaptive re-keying of encrypted data in an information processing system.

For example, in one embodiment, a method comprises the following steps. Utilization information associated with a storage system is obtained, wherein the storage system comprises a set of storage devices. The method dynamically selects a re-keying process from a plurality of different re-keying processes based on at least a portion of the obtained utilization information. At least a portion of the set of storage devices are re-keyed in accordance with the selected re-keying process.

Further illustrative embodiments are provided in the form of a non-transitory processor-readable storage medium having embodied therein executable program code that when executed by a processor causes the processor to perform the above steps. Still further illustrative embodiments comprise an apparatus with a processor and a memory configured to perform the above steps.

Advantageously, illustrative embodiments provide an adaptive re-keying process that optimizes timing and execution of the re-keying to best use storage system resources, minimize system impact, and automatically maintain cryptographic key compliance requirements.

These and other features and advantages of embodiments described herein will become more apparent from the accompanying drawings and the following detailed description.

BRIEF DESCRIPTION OF THE DRAWINGS

FIG. 4 is pseudocode for an adaptive re-keying methodology according to an illustrative embodiment.

DETAILED DESCRIPTION

Illustrative embodiments of the present invention will be described herein with reference to exemplary information processing systems and associated processing devices. It is to be appreciated, however, that embodiments of the invention are not restricted to use with the particular illustrative system and device configurations shown. Accordingly, the term "information processing system" as used herein is intended to be broadly construed, so as to encompass, for example, a wide variety of different processing platforms including cloud-based processing platforms that include combinations of virtual and physical compute, network and storage resources.

Figure 1:
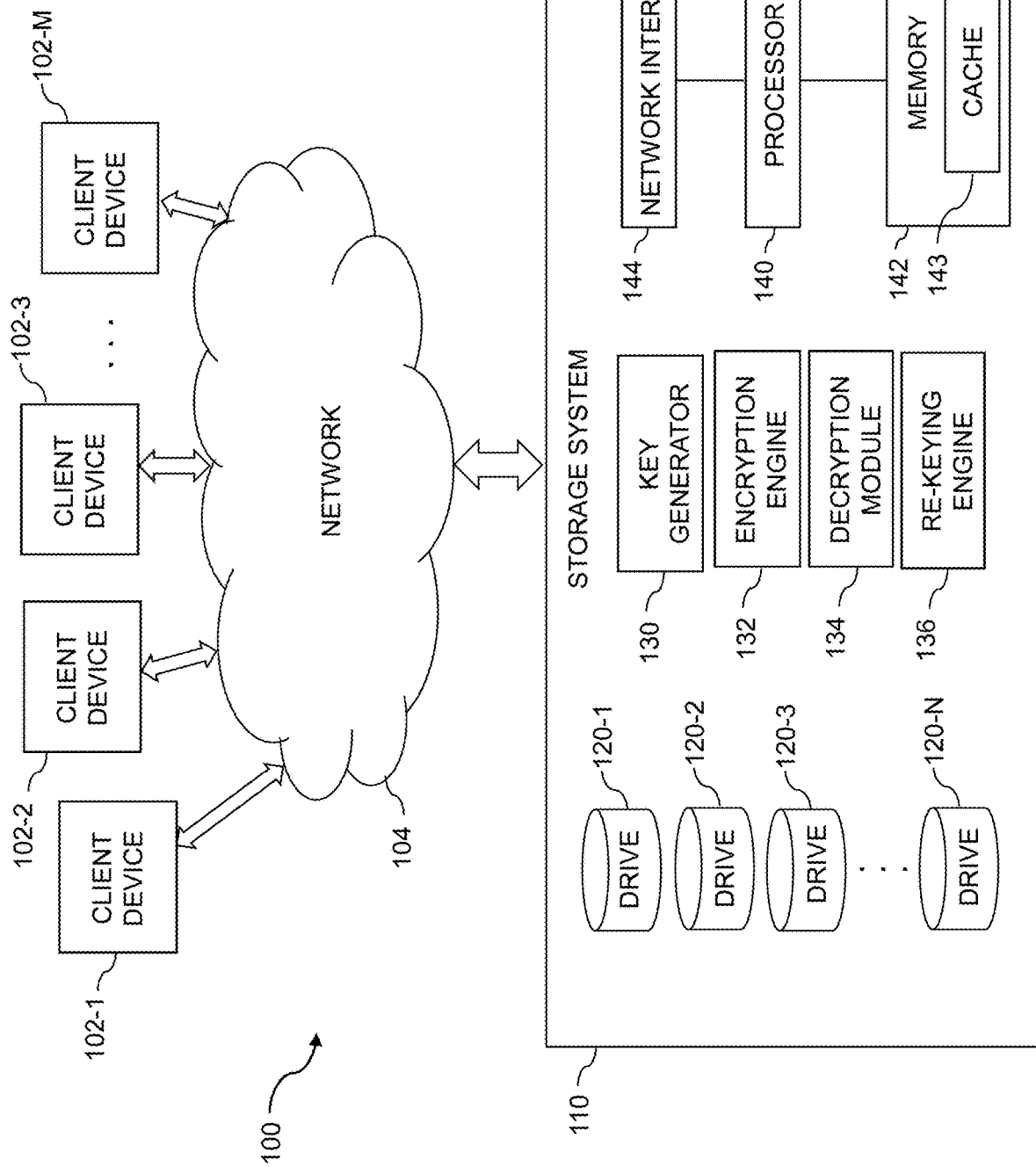
FIG. 1 is a block diagram of an information processing system comprising a storage system that implements adaptive re-keying of encrypted data in accordance with an illustrative embodiment.

FIG. 1 shows an information processing system 100 configured in accordance with an illustrative embodiment of the invention. The information processing system 100 comprises a plurality of client devices 102-1, 102-2, 102-3, . . . 102-M, collectively referred to herein as client devices 102 (or clients 102). The client devices 102 are coupled to a network 104. Also coupled to the network 104 is a storage system 110. While one storage system is depicted in FIG. 1, some embodiments comprise more than one storage system. Also, while storage system 110 is depicted in FIG. 1 as a single system, components of storage system 110 can be distributed into multiple systems in some embodiments.

The client devices 102 may comprise, for example, mobile telephones, laptop computers, tablet computers, desktop computers or other types of devices capable of sending and receiving data and/or messages over the network 104. Such devices are examples of what are more generally referred to herein as "processing devices."

The client devices 102 in some embodiments comprise respective computers associated with a particular company, organization or other enterprise. In addition, at least portions of the information processing system 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the information processing system 100, including a wide area network (WAN), a local area network (LAN), a satellite network, a telephone or cable network, a cellular network, a wireless network such as a WiFi or WiMAX network, or various portions or combinations of these and other types of networks. The information processing system 100 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

Storage system 110 implements data encryption techniques. Data encryption techniques implemented by storage system 110 are also referred to herein as "server-side" data encryption techniques, as the storage system 110 itself encrypts data items supplied to it in plaintext form by one or more of client devices 102. Such clients are also referred to herein as "tenants" of the storage system, where the term "tenant" as broadly used herein is intended to encompass, for example, clients that are members of a given domain of the storage system.

The storage system 110 in some embodiments may be part of a cloud storage system and the multiple tenants may comprise respective tenants of the cloud storage system. In such an arrangement, encrypted data storage is provided to the tenants as a service of the service provider operating the cloud storage system. The term "tenant" as used herein should not be viewed as limited to such cloud-based storage arrangements.

The storage system 100 in some embodiments may be implemented utilizing a VNX2® storage array or a Symmetrix VMAX® storage array, both commercially available from Dell EMC of Hopkinton, Mass. Alternatively, the storage system 110 can be implemented utilizing a flash-based storage array such as an XtremIO™ storage array or a Unity™ storage array, both also from Dell EMC.

The term "storage system" as used herein is intended to be broadly construed, and should not be viewed as being limited to storage arrays or any other storage system of a particular type. A given storage system as the term is broadly used herein can comprise, for example, network-attached storage (NAS), storage area networks (SANs), direct-attached storage (DAS) and distributed DAS, as well as combinations of these and other storage types, including software-defined storage.

Accordingly, storage system 110 in illustrative embodiments can include software-defined storage products such as ScaleIO™ and ViPR®, cloud storage products such as Elastic Cloud Storage (ECS), object-based storage products such as Atmos®, and scale-out NAS clusters comprising Isilon® platform nodes and associated accelerators, all from Dell EMC. Combinations of multiple ones of these and other storage products can also be used in implementing a given storage system in an illustrative embodiment. Storage system 110 may be comprised of one or more of what is more generally referred to herein as "processing devices."

As another processing platform example, portions of a given processing platform in some embodiments can comprise converged infrastructure such as VxRail™, VxRack™ or Vblock® converged infrastructure commercially available from VCE, the Virtual Computing Environment Company, an EMC Federation Company.

The particular processing platforms described above are presented by way of example only, and a given information processing system such as system 100 may include additional or alternative processing platforms, as well as numerous distinct processing platforms in any combination, with each such platform comprising one or more computers, servers, storage devices or other processing devices.

Processing devices and other information processing system components can communicate with one another using a variety of different communication protocols and associated communication media. Components of an information processing system as disclosed herein can be implemented at least in part in the form of one or more software programs stored in memory and executed by a processor of a processing device.

As further shown, storage system 110 comprises storage drives 120-1, 120-2, 120-3, . . . 120-N, collectively referred to herein as storage drives 120 (or drives 120) or individually as storage drive 120 (or drive 120). In some embodiments, storage devices 120 are solid state drives (SSDs). Such SSDs are implemented using non-volatile memory (NVM) devices such as flash memory. Other types of NVM devices can be used as some or all of drives 120 such as non-volatile random access memory (NVRAM), phase-change RAM (PC-RAM) and magnetic RAM (MRAM). These and various combinations of multiple different types of NVM devices may also be used.

However, it is to be appreciated that still other types of storage devices can be used in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises hard disk drives. The particular storage devices used in a given storage tier may be varied in other embodiments, and multiple distinct storage device types may be used within a single storage tier. The term "storage device" as used herein is intended to be broadly construed, so as to encompass, for example, flash drives, solid state drives, hard disk drives, hybrid drives or other types of storage devices.

In the FIG. 1 embodiment, the storage system 110 can implement one or more Redundant Array of Inexpensive Drives (RAID) arrays. That is, storage devices 120 can be part of a single RAID array or distributed into separate distinct RAID arrays. In one or more embodiments, one or more RAID arrays may also be referred to as a RAID Group (RG). An RG is an example of a "storage array group." Storage system 110, in some embodiments, is configured with multiple RGs. Each RG is assumed to store data in stripes across one or more SSDs (e.g., one or more of storage devices 120) in storage system 110.

As further shown in FIG. 1, storage system 110 comprises a key generator 130, an encryption module 132, a decryption module 134 and a re-keying engine 136.

The key generator 130 is utilized to generate data encryption keys for use in performing server-side encryption of data items for storage in the storage drives 120. The key generator 130 can also be used to generate secret keys that are utilized in generating data encryption keys. The encryption and decryption modules 132 and 134 are utilized to respectively encrypt and decrypt data items in conjunction with storage in and retrieval from the storage devices 120 and a cache as will be further explained below. In illustrative embodiments, each one of storage devices 120 may typically have its own data encryption key assigned.

As will be further explained below in illustrative embodiments, re-keying engine 136 is configured to provide adaptive re-keying of the data encryption keys used to initially or currently encrypt and decrypt the data items stored in the storage devices 120. More particularly, re-keying engine 136 provides a smart and self-managed re-keying process that optimizes timing and execution of the re-keying to best use storage system resources, minimize system impact, and automatically maintain compliant "crypto periods" (i.e., the time span during which a specific cryptographic key is authorized for use). It is to be appreciated that the re-keying engine 136 works in conjunction with the key generator 130 to determine when the key generator 130 generates new data encryption keys that are used to re-key data items (using encryption and decryption modules 132 and 134) stored in storage devices 120 and/or a cache associated with the storage system 110. All or a subset of components 130, 132, 134 and 136 may be referred to herein as a "re-keying manager." Illustrative embodiments of the adaptive re-keying process performed by a re-keying manager will be described below on the context of FIGS. 2 through 5.

It is to be appreciated that this particular arrangement of components in the storage system 110 is presented by way of example only, and alternative arrangements can be used in other embodiments. For example, the functionality associated with the components 130, 132, 134 and 136 in other embodiments can be distributed across a larger number of modules, combined into a single module, or distributed in fewer modules than are illustratively depicted in FIG. 1.

In some embodiments, components 130, 132, 134 and 136 are implemented in a cryptographic module of the storage system 110. The cryptographic module can be implemented at least in part utilizing a trusted platform module or other type of trusted hardware of the storage system 110. Such a trusted platform module provides highly secure storage for secret keys of the storage system 110 and in some embodiments comprises or is otherwise associated with a manager module configured to control secure storage of the secret keys of the storage system 110.

As mentioned previously, the storage system 110 in the FIG. 1 embodiment is assumed to be implemented using one or more processing devices. Each such processing device generally comprises at least one processor and an associated memory, and implements one or more functional modules for controlling certain features of the storage system 110.

More particularly, in this illustrative embodiment, the storage system 110 comprises a processor 140 coupled to a memory 142 and a network interface 144. As shown, and as will be further explained below in the context of FIG. 2, memory 142 includes a cache 143.

The processor 140 illustratively comprises a microprocessor, a microcontroller, an application-specific integrated circuit (ASIC), a field-programmable gate array (FPGA), a graphics processing unit (GPU) or other type of processing circuitry, as well as portions or combinations of such circuitry elements.

The memory 142 illustratively comprises random access memory (RAM), read-only memory (ROM), flash memory or other types of memory, in any combination. The memory 142 and other memories disclosed herein may be viewed as examples of what are more generally referred to as "processor-readable storage media" storing executable computer program code or other types of software programs.

Articles of manufacture comprising such processor-readable storage media are considered embodiments of the present invention. A given such article of manufacture may comprise, for example, a storage device such as a storage disk, an integrated circuit containing electronic memory, or a wide variety of other types of computer program products comprising processor-readable storage media. The term "article of manufacture" as used herein should be understood to exclude transitory, propagating signals.

The network interface 144 allows the storage system 110 to communicate with the client devices 102 over the network 104. The network interface 144 illustratively comprises one or more conventional transceivers.

Particular components of the storage system 110, such as one or more of key generator 130, encryption module 132, decryption module 134 and re-keying engine 136, are illustratively implemented at least in part in the form of software that is stored in memory 142 and executed by processor 140.

Cache 143 may illustratively comprise volatile memory such as, e.g., random access memory (RAM), dynamic random-access memory (DRAM), static random-access memory (SRAM), or any other kind of volatile memory. In some embodiments, cache 143 may support a variety of operations or functions of storage system 110 including, for example, write cache, read cache, temporary metadata storage, or other similar operations.

As mentioned previously, the components 130, 132, 134 and 136 are utilized in performing server-side encryption and decryption operations relating to the stored encrypted data items of the storage system 110. Such operations in the present embodiment illustratively involve generating data encryption keys and utilizing those data encryption keys to encrypt respective ones of the data items for storage in the storage system 110. The resulting encrypted data item is stored in the storage devices 120.

In some embodiments, asymmetric keys are used, such that different keys are used for encryption and decryption. Other embodiments can use symmetric keys, such that the same key used for encryption is also used for decryption. Various combinations of asymmetric and symmetric keys can be used. The term "key" as used herein is intended be broadly construed so as to encompass these and other arrangements of cryptographic information suitable for securing access to data. The term "data" as used herein is also intended to be broadly construed and is not restricted to any particular format or formats.

Illustrative embodiments, as mentioned above, provide a systematic, adaptive re-keying process for storage drives 120 in the storage system 110. More particularly, rather than having predefined re-key dates or time intervals as in the conventional approach, the re-keying engine 136 in one or more embodiments sets compliance limits (e.g., compliant crypto periods) for all the storage drive encryption keys, and collects system resources and performance data with which the re-keying engine 136 dynamically calculates the re-key order/priority of all Raid Groups (RGs), the timing of re-keying and a best re-keying procedure. The re-keying engine 136 continuously calculates to determine which RG to re-key next, when to start the process, what re-key procedure to use, and at what speed level. The re-keying engine 136 then communicates the re-keying instructions to the key generator 130 which generates new keys consistent with the instructions, and initiates re-keying through encryption module 132 and decryption module 134.

Furthermore, as will be further explained below, the re-keying engine 136 provides a self-managed RG re-key prioritization/scheduling approach in one or more illustrative embodiments. The re-keying engine 136 first prioritizes an RG re-key execution order according to the expiration dates of the drive encryption keys (i.e., data encryption key for each storage drive 120). Then, the re-keying engine 136 estimates a required total time to re-key all drives 120 based the data volume and a medium drive re-key speed. Based on that estimated total time, the re-keying engine 136 sets the start time of the prioritized RG to start the re-keying. As mentioned above, the re-keying instructions (e.g., which RG to re-key, when to start the process, what re-key procedure to use, and at what speed level) are provided by the re-keying engine 136 to the key generator 130 which implements the adaptive re-keying process consistent with the re-keying instructions.

Before starting a re-keying process on an RG, the re-keying engine 136 performs a pre-rekey system impact check to see whether a given RG is currently under high input/output (I/O) unitization. What threshold I/O workload constitutes "high I/O utilization" is determined by the system administrator and/or a utilization optimization algorithm according to one or more embodiments. For example, if the given RG is under high I/O utilization, the re-keying engine 136 reprioritizes the next RG in the priority queue.

Illustrative embodiments further provide for dynamic selection of a given re-keying procedure to minimize system impact. If the adaptive rekey engine 136 determines one or more storage drives 120 or one or more RGs will become non-compliant (e.g., crypto period will expire soon), the engine 136 alerts the affected client device(s) (one or more of clients 102 or tenants) and suggests several options along with corresponding consequences. For example, to stay compliant, one option may be to allow the re-keying engine 136 to consume more cache and suffer performance issues for some time period t.

Figure 2:
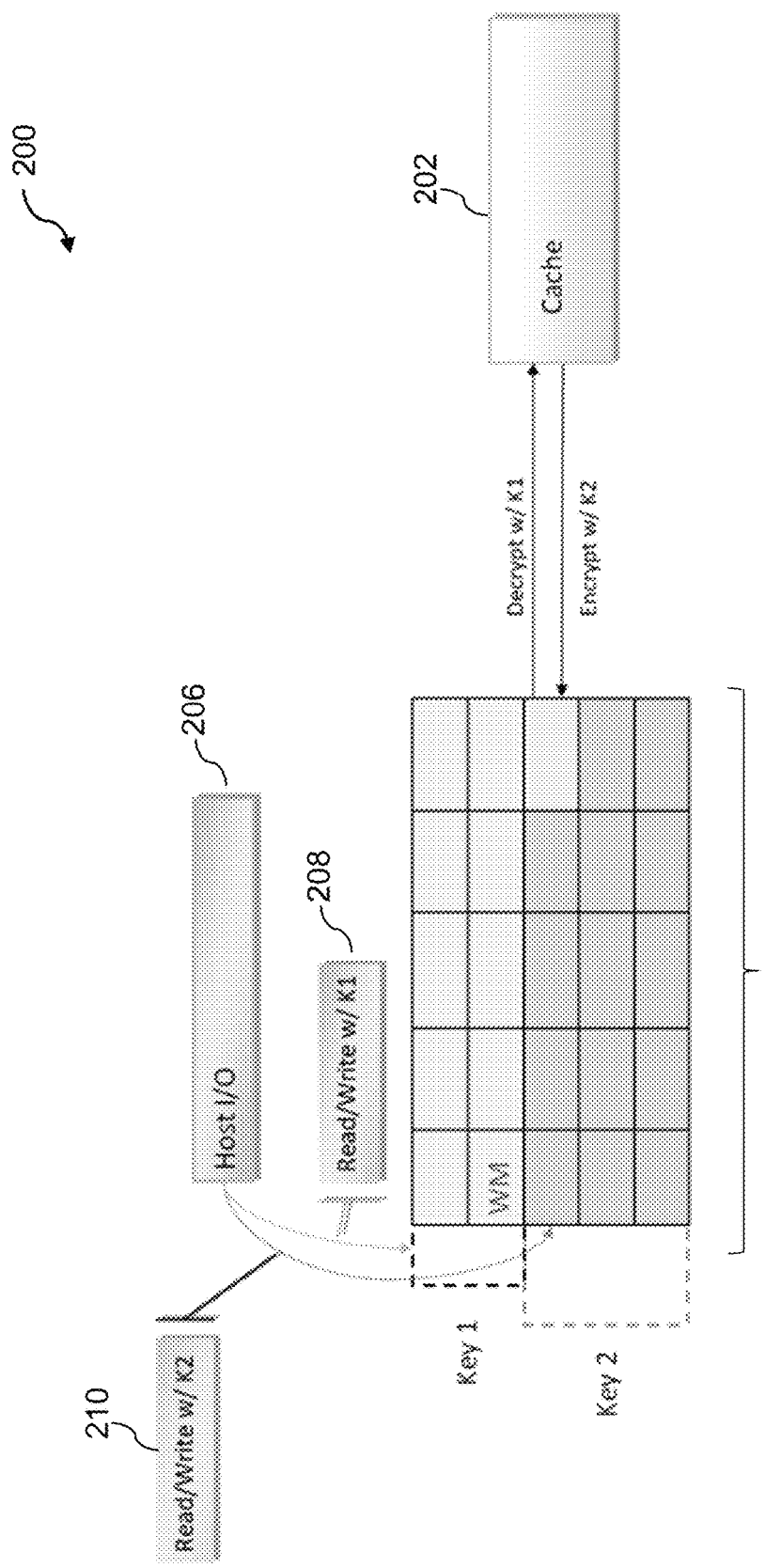
FIG. 2 is a block diagram of a re-keying process according to one illustrative embodiment.
Figure 3:
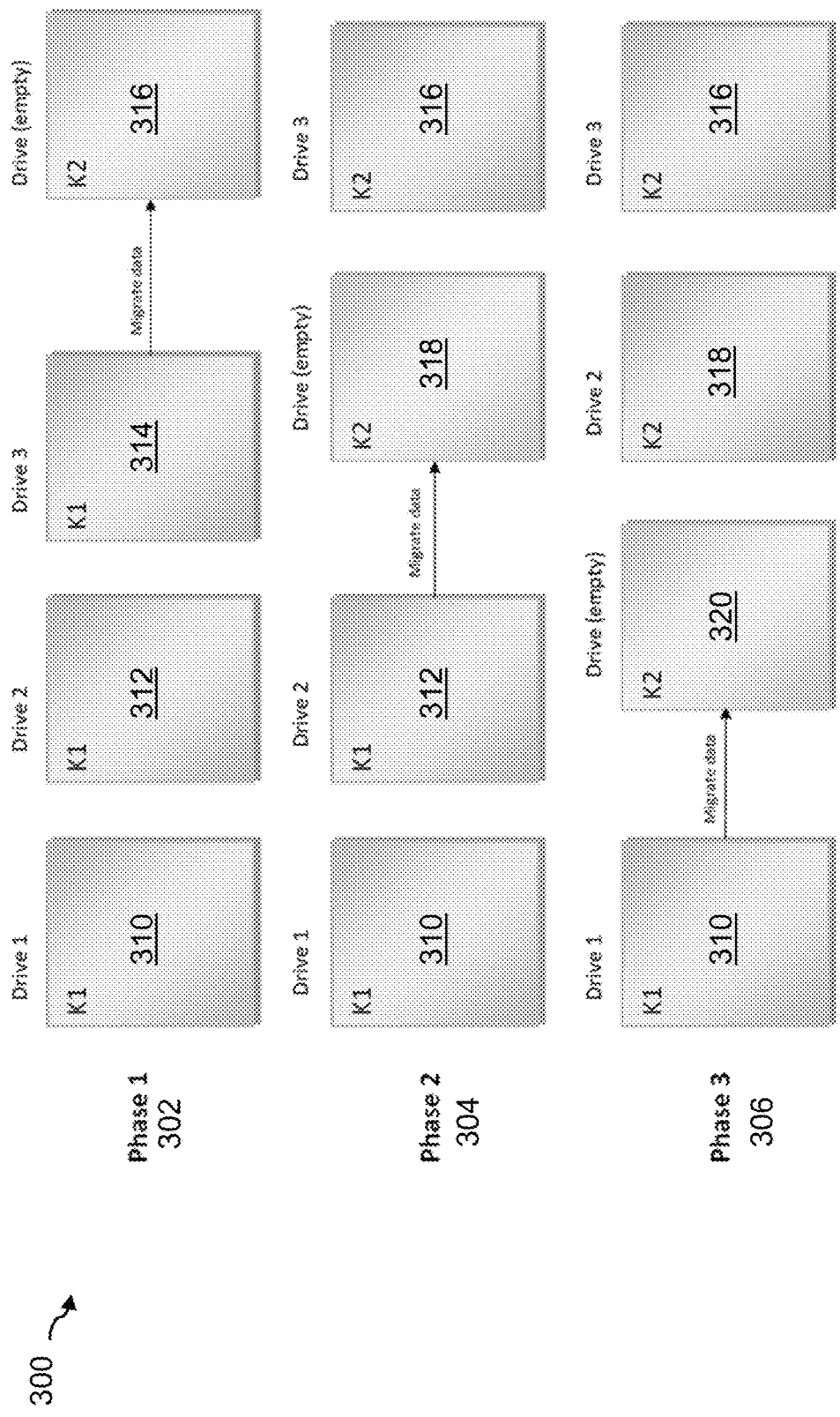
FIG. 3 is a block diagram of a re-keying process according to another illustrative embodiment.

Furthermore, an illustrative embodiment provides two procedures to rotate the drive encryption keys, one referred to as a data in place re-keying process (FIG. 2) and the other referred to as re-keying through proactive sparing (FIG. 3). As will be explained, the two procedures use different algorithms, consume different system resources, and have different system impact. The re-keying engine 136 uses real-time system performance data to determine and then select the most suitable procedure to minimize impact. While two procedures are described, it is to be appreciated that embodiments are not limited to the two re-keying procedures described in FIGS. 2 and 3. Alternative embodiments can include more or other re-keying procedures that are selectable by the re-keying engine 136.

The two illustrative re-keying procedures will now be described.

FIG. 2 illustrates data in place re-keying process 200 controlled by a re-keying manager according to an illustrative embodiment. Recall that the term re-keying manager as used herein refers to all or a subset of the functionalities provided by the key generator 130, the encryption module 132, the decryption module 134 and the re-keying engine 136.

The rekey manager uses cache 202 (e.g., cache 143 in FIG. 1) to read the data stored in a given storage device 120 (not expressly shown), and decrypts the data using a first data encryption key K1. The rekey manager then uses a new (second) data encryption key K2 to encrypt the data and over-write the existing ciphertext at the original address. The data being re-keyed is illustrated as a set of data blocks 204 wherein each block has a unique address. Embodiments are not limited to data of any format, and thus data blocks are used here only as an example.

In this approach, a watermark (depicted in data blocks 204 as "WM") is used to keep track of the boundary between ciphertext encrypted with K1 and the ciphertext encrypted with K2. This watermark is utilized by the rekey manager to remember which addresses in the subject data blocks have been encrypted with K1 (light grey shaded blocks) versus K2 (darker grey shaded blocks). Any data in the set of data blocks 204 below the watermark WM is encrypted with K2, and the watermark address, and addresses above the watermark are still encrypted with K1. Note that host I/O 206 refers to data read and/or data write requests from a given client device 102. Thus, reads/write requests that come in during the re-keying process for addresses with data that is still encrypted with K1 are represented by 208, while reads/write requests for addresses with data that is encrypted with K2 are represented by 210. The data in place re-keying 200 consumes system cache, which may not be preferred when cache consumption is high.

FIG. 3 illustrates a re-keying through proactive sparing process 300 according to an illustrative embodiment. As with process 200 in FIG. 2, process 300 in FIG. 3 is controlled by the re-keying manager.

For proactive sparing, an empty drive is required to migrate the data off one drive and onto the empty drive. By doing this, the data can be decrypted with K1 from drive n, and encrypted with K2 when written to the empty drive. The former empty drive is now relabeled as drive n.

As shown in FIG. 3, re-keying can be performed in phases: Phase 1 (302), Phase 2 (304) and Phase (306). Assume that a given RG is being re-keyed and includes three drives ("Drive 1", "Drive 2" and "Drive 3") and that one or more spare drives ("Drive (empty)") are available. Note that with reference to FIG. 1, the drives depicted in FIG. 3 are part of the storage drives 120.

Thus, in Phase 1, Drives 1-3, labeled drives 310, 312 and 314 respectively, currently use data encryption key K1. To re-key drive 314, the data on drive 314 is re-keyed using key K2 and stored on spare drive 316 (which then becomes Drive 3). In Phase 2, to re-key drive 312, the data on drive 312 is re-keyed using key K2 and stored on another spare drive 318 (which then becomes Drive 2). In Phase 3, to re-key drive 310, the data on drive 310 is re-keyed using key K2 and stored on yet another spare drive 320 (which then becomes Drive 1).

Accordingly, this approach requires spare drives. If a spare drive is not available at each phase, then the proactive sparing re-keying approach is blocked.

Illustrative embodiments provide for dynamic selection of a given re-keying procedure from a plurality of re-keying process (e.g., process 200 and process 300) to minimize system impact.

FIG. 4 illustrates pseudocode 400 illustrating adaptive logic/design of a dynamic selection of a suitable re-keying procedure from a plurality of re-keying procedures in accordance with an illustrative embodiment. It is to be appreciated that the pseudocode 400 can be executed by a re-keying manager (e.g., all or a subset of the functionalities provided by the key generator 130, the encryption module 132, the decryption module 134 and the re-keying engine 136).

As shown, the pseudocode 400 first checks whether a spare drive(s) is available and all drives are in a healthy condition (e.g., ready and able to be re-keyed). If so, then proactive sparing re-keying begins. If not, a check is made to determine whether cache utilization is above a percentage threshold value. In some embodiments, the percentage threshold value is a configurable parameter (e.g., specified by a user, a system and/or an algorithm). If so, then the pseudocode 400 enables the re-keying manager to wait for a period of time (e.g., one day) for a sparing drive(s) to be available and then performs proactive sparing re-keying if a spare drive becomes available.

If, however, pseudocode 400 determines cache utilization is not above the percentage threshold value (or the above wait period expires before a spare drive is available), data in place type re-keying (FIG. 2) is selected. As shown, based on the level of I/O utilization, a specific re-keying speed is selected (if I/O workload is high then select low re-keying speed; if I/O workload is medium then select medium re-keying speed; otherwise select high re-keying speed). The terms "high," "medium," "low" for I/O utilization, and the terms "fast," "medium," and "low" for re-keying speeds are relative terms and can be set by a system administrator, a system and/or an algorithm based on the requirements of the specific storage system with which the pseudocode 400 is executed.

Pseudocode 400 is intended to be a nonlimiting example, and one or more of the re-keying process choices and the conditions for selection may be different in alternative embodiments.

Figure 5:
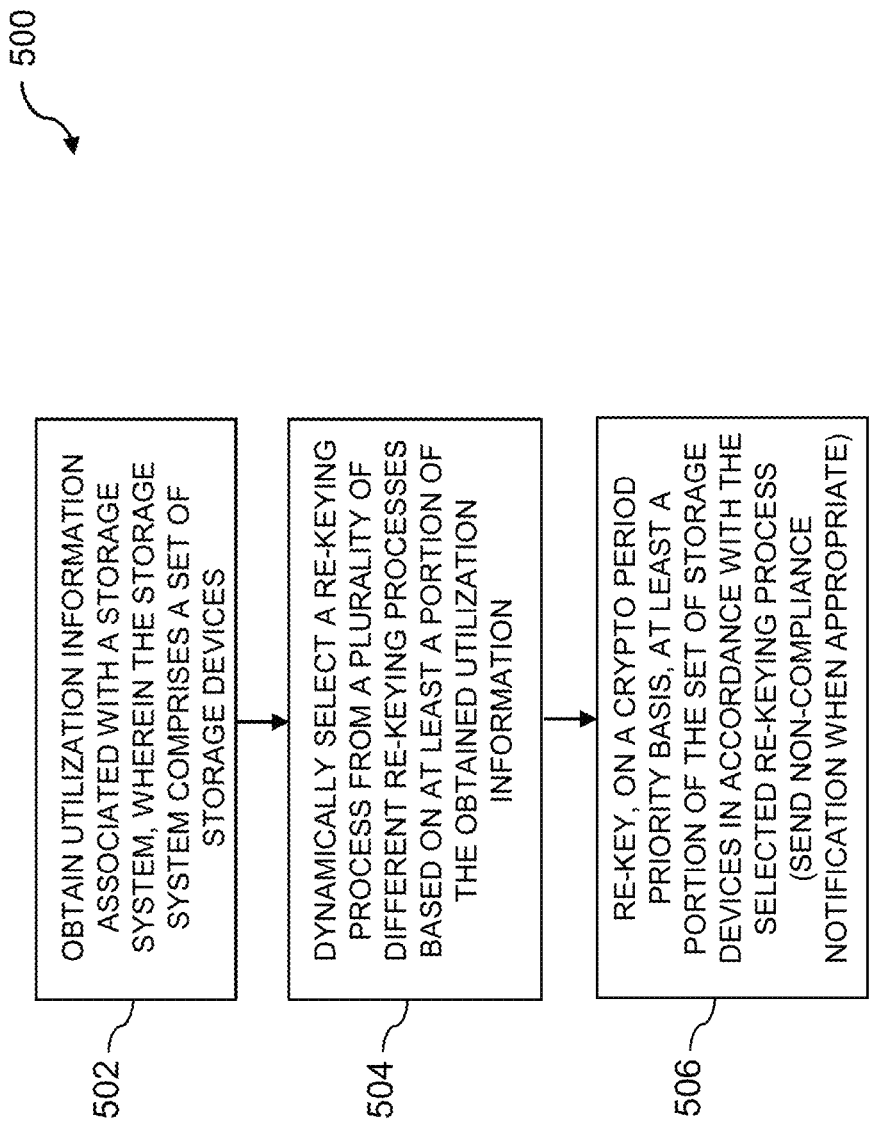
FIG. 5 is a flow diagram of an adaptive re-keying methodology according to an illustrative embodiment.

FIG. 5 illustrates a methodology 500 to provide adaptive re-keying including dynamic selection as described herein.

In step 502, a re-keying manager obtains utilization information associated with a storage system, wherein the storage system comprises a set of storage devices.

In step 504, the re-keying manager dynamically selects a re-keying process from a plurality of different re-keying processes based on at least a portion of the obtained utilization information.

In step 506, the re-keying manager re-keys, on a crypto period priority basis, at least a portion of the set of storage devices in accordance with the selected re-keying process. As mentioned above, the re-keying manager sends a non-compliance notification when appropriate.

Advantageously, adaptive re-keying according to illustrative embodiments has many advantages. For example, adaptive re-keying does not depend on a static re-keying policy preconfigured in the storage system. The static policy sets the dates or time intervals for the re-keying events. Adaptive re-keying dynamically manages the re-keying process of all drives in the storage system.

Further, adaptive re-keying according to illustrative embodiments dynamically selects the most suitable re-keying procedure, for example in the example above, either data-in-place re-keying or re-keying through proactive sparing, according to real-time available resources to minimize impact.

Still further, adaptive re-keying according to illustrative embodiments dynamically sets the re-keying schedule to maintain compliant crypto periods, and generates an alert for any predicted compliance violation based on re-keying speed and compliance rules.

It should again be emphasized that the above-described embodiments of the invention are presented for purposes of illustration only. Many variations and other alternative embodiments may be used. For example, the disclosed techniques are applicable to a wide variety of other types of information processing systems and associated processing devices. Also, the particular features of the illustrative embodiments of FIGS. 1-5 can be varied in other embodiments. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. An apparatus, comprising:
   at least one processing device comprising a processor coupled to a memory;
   the processing device implementing a re-keying manager for re-keying a set of storage devices in a storage system, wherein the set of storage devices comprise a set of storage array groups, wherein each of the set of storage array groups has a cryptographic key for use;
   wherein the re-keying manager is configured to:
   set a compliance limit for each of the cryptographic keys;
   obtain utilization information associated with the storage system based at least in part on system resources and performance data, the system resources and the performance data being utilized with the compliance limit set for each of the cryptographic keys to dynamically calculate a re-key order;
   dynamically select a re-keying process from a plurality of different re-keying processes based on at least a portion of the obtained utilization information and the re-key order; and
   re-key at least a portion of the set of storage devices in accordance with the selected re-keying process.

2. The apparatus of claim 1, wherein the utilization information comprises a utilization percentage value associated with a cache of the storage system.

3. The apparatus of claim 2, wherein a first re-keying process of the plurality of different re-keying processes is selected when the cache utilization percentage value is below a given threshold value, and wherein a second re-keying process of the plurality of different re-keying processes is selected when the cache utilization percentage value is at or above the given threshold value.

4. The apparatus of claim 3, wherein the first re-keying process comprises a proactive sparing re-keying process, and the second re-keying process comprises a data in place re-keying process.

5. The apparatus of claim 1, wherein the utilization information comprises an input/output workload level.

6. The apparatus of claim 5, wherein a speed of the selected re-keying process is selected based on the input/output workload level.

7. The apparatus of claim 1, wherein re-keying is performed on a priority basis such that one storage array group is re-keyed before another storage array group based on which storage array group has a time span due to expire sooner.

8. The apparatus of claim 1, wherein the re-keying manager is further configured to send an alert when a time to re-key a given storage array group is longer than a remainder of a given time span.

9. A method, comprising:
   obtaining utilization information associated with a storage system based at least in part on system resources and performance data, wherein the storage system comprises a set of storage devices comprising a set of storage array groups, wherein each of the set of storage array groups has a cryptographic key for use, wherein the system resources and the performance data are utilized with a compliance limit set for each of the cryptographic keys for at least dynamically calculating a re-key order;

dynamically selecting a re-keying process from a plurality of different re-keying processes based on at least a portion of the obtained utilization information and the re-key order; and re-keying at least a portion of the set of storage devices in accordance with the selected re-keying process;

wherein the obtaining, dynamic selecting and re-keying are performed by at least one processing device comprising a processor coupled to a memory.

10. The method of claim 9, wherein the utilization information comprises a utilization percentage value associated with a cache of the storage system.

11. The method of claim 10, wherein a first re-keying process of the plurality of different re-keying processes is selected when the cache utilization percentage value is below a given threshold value, and wherein a second re-keying process of the plurality of different re-keying processes is selected when the cache utilization percentage value is at or above the given threshold value.

12. The method of claim 11, wherein the first re-keying process comprises a proactive sparing re-keying process, and the second re-keying process comprises a data in place re-keying process.

13. The method of claim 9, wherein the utilization information comprises an input/output workload level.

14. The method of claim 13, wherein a speed of the selected re-keying process is selected based on the input/output workload level.

15. The method of claim 9, wherein the re-keying step is performed on a priority basis such that one storage array group is re-keyed before another storage array group based on which storage array group has a time span due to expire sooner.

16. The method of claim 9, further comprising sending an alert when a time to re-key a given storage array group is longer than a remainder of a given time span.

17. A non-transitory processor-readable storage medium having stored therein program code of one or more software programs, wherein the program code when executed by at least one processing device causes said processing device to:

obtain utilization information associated with a storage system based at least in part on system resources and performance data, wherein the storage system comprises a set of storage devices comprising a set of storage array groups, wherein each of the set of storage array groups has a cryptographic key for use, wherein the system resources and the performance data are utilized with a compliance limit set for each of the cryptographic keys for at least dynamically calculating a re-key order;

dynamically select a re-keying process from a plurality of different re-keying processes based on at least a portion of the obtained utilization information and the re-key order; and re-key at least a portion of the set of storage devices in accordance with the selected re-keying process.

18. The processor-readable storage medium of claim 17, wherein the re-keying step is performed on a priority basis.

19. The processor-readable storage medium of claim 17, wherein the utilization information comprises a utilization percentage value associated with a cache of the storage system.

20. The processor-readable storage medium of claim 17, wherein the utilization information comprises an input/output workload level.

* * * * *